(12) United States Patent
McGaughey et al.

(10) Patent No.: US 6,708,134 B2
(45) Date of Patent: Mar. 16, 2004

(54) METHOD TO ESTIMATE MOTOR SPEED FOR STABILIZED MOTOR CONTROL

(75) Inventors: Donald R. McGaughey, Odessa (CA); Mohammed Tarbouchi, Kingston (CA); Ken Nutt, Lakefield (CA)

(73) Assignee: Her Majesty the Queen in right of Canada, as represented by the Minister of National Defence, Ottawa (CA)

(*) Notice: Subject to any disclaimer, the term of this patent is extended or adjusted under 35 U.S.C. 154(b) by 0 days.

(21) Appl. No.: 10/241,390

(22) Filed: Sep. 4, 2002

(65) Prior Publication Data

US 2003/0154041 A1 Aug. 14, 2003

Related U.S. Application Data

(60) Provisional application No. 60/317,716, filed on Sep. 5, 2001.

(51) Int. Cl.[7] .............................................. G06F 15/00
(52) U.S. Cl. ...................... 702/145; 318/798; 318/799; 318/801; 318/802; 318/808; 318/811; 318/700
(58) Field of Search .......................... 702/145; 318/798, 318/799, 801, 802, 803, 808, 811, 700

(56) References Cited

U.S. PATENT DOCUMENTS

| | | | | |
|---|---|---|---|---|
| 4,825,132 A | * | 4/1989 | Gritter ........................ | 318/811 |
| 4,885,520 A | | 12/1989 | Sugimoto et al. ........... | 318/808 |
| 5,402,053 A | * | 3/1995 | Divan et al. ................ | 318/768 |
| 5,644,205 A | | 7/1997 | Nguyen Phuoc et al. ... | 318/801 |
| 5,959,429 A | | 9/1999 | Tajima et al. ............... | 318/799 |
| 5,969,498 A | * | 10/1999 | Cooke ........................ | 318/799 |
| 5,994,870 A | | 11/1999 | Kaneko et al. .............. | 318/798 |
| 6,005,365 A | | 12/1999 | Kaneko et al. .............. | 318/700 |
| 6,069,467 A | | 5/2000 | Jansen ........................ | 318/802 |
| 6,242,885 B1 | | 6/2001 | Ide et al. .................... | 318/811 |

* cited by examiner

Primary Examiner—John Barlow
Assistant Examiner—Aditya Bhat

(57) ABSTRACT

A method to estimate motor speed for extended stabilized rotational control of an induction motor at all speeds including slow speeds. The speed estimator supplies real-time time motor control feedback information for a variable speed motor drive controller without a mechanical encoder. The speed estimator is based on an optimized fast orthogonal search algorithm with control of the carrier drive frequency to reduce computation time. The reduced processing time provides for an update rate to the motor controller sufficient to maintain motor stability to near zero the motor rated base speed.

20 Claims, 7 Drawing Sheets

METHOD TO ESTIMATE MOTOR SPEED FOR STABILIZED MOTOR CONTROL

CROSS REFERENCE TO RELATED APPLICATIONS

I hereby claim benefit under Title 35, United States Code, and Section 119(e) of U.S. provisional patent application Ser. No. 60/317,716 filed Sep. 5, 2001. This application is a continuation of the No. 60/317,716 application. The No. 60/317,716 application is currently pending. The No. 60/317,716 application is hereby incorporated by reference into this application.

BACKGROUND OF THE INVENTION

1. Field of the Invention

The present invention relates generally to motor speed control and more specifically it relates to a method to signal an encoderless motor controller to maintain low speed motor stability.

2. Description of the Prior Art

It can be appreciated that motor controllers have been in use for years. Motor controllers are used in a wide variety of environments to vary the activation, speed, torque or even the motor shaft position of a motor as required for the application. Manufacturing plants use a multitude of motor controllers for simple and complex operations, for speed control of an air handling fan, to highly precision maneuvers for each step in an automated manufacturing process. Production floor equipment that utilizes computer numerical controls (CNC) is dependent on controllable motors to accurately machine the desired product. For example, a CNC lathe may be used to make machine parts such as a transmission component for a truck transmission. The raw material is clamped to the lathe spindle and a predefined program is initiated by the station operator to manufacture the part by an automatic multi-step process. The program is essentially designed to control the speed of the spindle and the positioning of a number of cutting tools to correctly machine the part. Each movement of the process is provided by a motor and motor controller pair as directed by the specialized program. The accuracy of the finished product is directly dependent on the ability of the motor/motor controller pair to meet design tolerance, to achieve the desired shape.

Alternating Current (AC) variable speed (motor) drives (VSD) are available in three principal types: open loop, encoderless and closed loop that provide increasingly sophisticated command of induction (and permanent magnet synchronous) motors. These VSDs are designed to modulate a power source, where pulse width modulation (PWM) is common, to control small ¾ to large 60 horsepower AC induction motors. The open-loop VSD employ the simplest motor control, the so-called Volts per Hertz (V/Hz) method. These are also known as "scalar" control to differentiate it from the other closed-loop designs where the V/Hz runs in an open loop without a formal feedback device; however, current and voltage sensing is done for current limiting and slip estimation. The V/Hz VSD does not offer torque control or high torque values at low speeds. The V/Hz method is recognized as a lower cost approach to basic motor speed control providing relatively low speed and torque response. It has the advantage to easily control several motors from one drive, popular for driving pumps, fans and other continuous process applications.

FIG. 1 shows a simplified block diagram 100 of a closed loop type variable speed drive and motor. The motor speed controller 101 accepts speed commands form a speed reference 102 and power 104 to be managed by the motor controller to the motor 103. A tachometer 105 is shown to generate the feedback information to close the control loop where the tachometer input shaft is mechanically attached to the rotor of the motor to generate electrical feedback signals to the controller. The tachometer shown represents old technology where today's designs use an encoder. Motor control designs for the synchronous DC servo motor employ a resolver for feedback information. The speed reference 102 is derived from a 0 to 10 VDC level, typically delivered by a digital to analog converter common to integrated circuits or, for simple manual control, generated by a potentiometer referenced to a VDC source and ground. The input power 104 is selected from a common single phase or three phase (120/208 VAC) bus for compatibility with the basic rating (and motor controller) of the motor. In this approach to VSD, the performance characteristics are much improved in every respect with the additional capacity for torque control. However, the external mechanical encoder requires extra wiring, careful mount alignment with the motor shaft (or geared output) and generally detracts from an intrinsic robustness of the AC motor drive. Moreover, for low fractional horsepower systems, the cost of the sensor can approach 50% of the motor price.

Several manufacturers utilize flux-vector control (FVC) in their closed loop VSD designs. FVC has several variations and is considered the "high end" in induction motor control performance today as opposed to the other methods. The field oriented FVC is the most capable embodiment where it models characteristics of the DC motor through independent control of flux-producing (magnetizing) and torque-producing current components to derive optimal control of motor torque and power. In this version, an actual feedback device, most often an encoder is used for motor position and speed information with very sophisticated motor models used in the control algorithms. FVC allows true torque-mode operation and employs separate speed and torque loops. An adaptive controller adds higher dynamic torque regulation and can account for motor temperature changes and other control disturbances and still deliver optimal torque output. This type of FVC delivers high torque at low speeds and offers very linear parameters over the whole speed range. Other "vector" drives also treat flux and torque currents as a vector sum of total motor current to improve on speed control and torque output but these drive products are derived from a V/Hz base and do not deliver field oriented FVC performance.

The encoderless variable speed drive (EVSD) is the third type of VSD offered today and provides a performance compromise between the expensive closed loop design and the basic V/Hz drives. The EVSD senses the voltage and/or current waveform impressed on the motor drive to motor connection by the running motor to estimate torque and magnetizing components as well as the vector relationship between them. EVSD performance is proportional to the number of motor parameters measured. Without a mechanical feedback device, the EVSD avoids the cost, wear and maintenance problems associated with the closed loop systems; however, the EVSD cannot match the performance of the closed loop VSD. The performance of the three types of variable speed drives available today are shown for comparison in the following table:

|  | V/Hz VSD | Encoderless VSD | FVC VSD |
| --- | --- | --- | --- |
| Speed Regulation | 1% | 0.5% | 0.01% |
| Speed Range | 40:1 | 120–60:1 | 600:1 |
| Low Speed @ 1800 RPM Base Speed, 60 Hz Motor | 45 RPM | 15–30 RPM (1.0 Hz) | 3 RPM |
| Torque Regulation | None | +/−5% | +/−2% |
| Starting Torque | 150% | 150% | 150–300% |

Encoderless speed controls or estimators are made based on the principle that the motor speed can be estimated from a measurement of the current and voltage waveform at the motor connection. AC induction motors are driven or speed regulated by a known frequency, the fundamental frequency, and a controlled bus voltage. Motor rotation induces other frequencies in the current waveform due to the physical construction (rotor bars or winding gaps) of the motor rotor. A speed estimate can be generated by detecting these induced speed related frequencies and comparing them to a known mathematical model relating the induced frequencies to the motor speed. This mathematical model is described in P. Alger, "The Nature of Induction Machines", Gordon and Breach, New York, 1965. Current EVSDs vary in capability and performance, depending on their derivation from either a V/Hz or vector control base. The ability of the EVSD is very dependent on the latest modeling and adaptation methods since they infer rather than sense motor shaft information.

Current EVSD designs exhibit instability below 1% rated speed which puts a limit on the speed range due to the limitations of current technology. Instability at low speed is exasperated by harsh load dynamics (fast start/stop of high inertial loads) and determines the low speed set point of each application generally determined during system commissioning. It is known to be costly and complex to build a system that will run stable to 0.5 Hz where the end performance is a balance of cost and performance. This low speed system requires the use of more sensors, careful matching of the motor to the drive, tuning tasks, and a longer commissioning time. The best encoderless drives add voltage sensing to current sensing to help with low speed operation.

A 1,800 RPM base speed, 60 Hz induction motor under sophisticated encoderless drive control is generally limited to about 20 RPM. This corresponds to the PWM type inverter operating at a fundamental drive frequency of about 1 Hz under a light load. Current EVSDs mainly use the Fast Fourier Transform (FFT) to detect the speed induced frequencies. Using the FFT, the frequency resolution is shown to depend on the number of samples represented in following equation:

$$R_{FFT} = F_s/N \quad (1)$$

Where $R_{FFT}$ is the resolution, $F_s$ is the sampling frequency and N is the sample length. The FFT requires one second or more of sampled data to achieve the 1 Hz frequency resolution. Using non-overlapping blocks of sample data, a one second sample collection time would limit the motor speed to be controlled to once per second. Also, the speed estimate gathered would correspond to the motor speed of up to a second ago. This long delay and low rate of speed estimation limits the low speed of the particular application.

Another problem with prior art EVSD designs is the "smudging" effect that can occur when using a long collection time if the speed of the motor changes during the collection period. The energy in the speed waveform can get spread across several frequency bins of the FFT; consequently, their amplitudes are smaller and potentially undetectable. In some cases, the spectral smudging can be substantial enough to prevent extraction of any kind of information for speed estimation from the spectrum.

Another problem with prior art FFT spectral estimation occurs when the fundamental frequency of the controller is not exactly on a frequency measured by the FFT. In this case, the energy from the fundamental (drive) frequency will be spread out among all the frequencies of the FFT in a phenomenon known as spectral leakage. The spectral leakage of the fundamental frequency may have more energy than those of the speed related frequency information and completely mask the speed related frequency information rendering detection for speed estimation improbable.

In these respects, the present inventive solution substantially departs from the conventional concepts, methods and apparatus designs of the prior art, and in so doing provides a method to provide a speed estimator to enable an encoderless variable speed motor drive with a greater speed range with enhanced stability at low speeds.

SUMMARY OF THE INVENTION

In view of the foregoing disadvantages inherent in the known types of motor controller speed estimators now present in the prior art, the present invention provides a method for a speed estimator to estimate the speed of an AC motor to sufficiently signal an encoderless motor controller for rotational stability at all speeds, including slow speeds. The inventive speed estimation method is based on a modified application of the Fast Orthogonal Search (FOS) technique with fast correlation calculations. The inventive approach uses a fraction of the motor waveform samples required with the prior art FFT methods to achieve a faster real-time speed estimate. The shortened computational time of the speed estimator provides for increased torque and rotational stability throughout the speed range, from near zero to the maximum (base) motor speed.

The general purpose of the present invention, which will be described subsequently in greater detail, is to provide an motor speed estimator for an encoderless AC induction motor controller that has many of the advantages of the standard systems mentioned heretofore and many novel features that result in a new method which is not anticipated, rendered obvious, suggested, or even implied by any of the prior art standard motor controllers, either alone or in any combination thereof.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method that will overcome the shortcomings of the prior art devices.

An object of the present invention is to provide an encoderless speed motor control system with a fast orthogonal search speed estimator and method thereof for estimating the speed of a motor.

Another object of the present invention is to provide a real-time fast orthogonal search speed estimator and method thereof for accurately determining the speed of a motor.

Another object of the present invention is to provide a real-time fast orthogonal search speed estimator and method thereof for determining the speed of a motor that is capable of providing high resolution for motor stability at near zero motor speeds.

Another object of the present invention is to provide a real-time fast orthogonal search speed estimator and method thereof for determining the speed of a motor that is adaptable to current encoderless variable AC motor drive configurations.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, an erasable programmable read only memory (EPROM), random access memory (RAM), magnetic and optical storage devices such as disk drives, magnetic tape, CDs (compact discs) and DVDs (digital video discs), and computer instruction signals embodied in a transmission medium (with or without a carrier wave upon which the signals are modulated).

Figure 1:
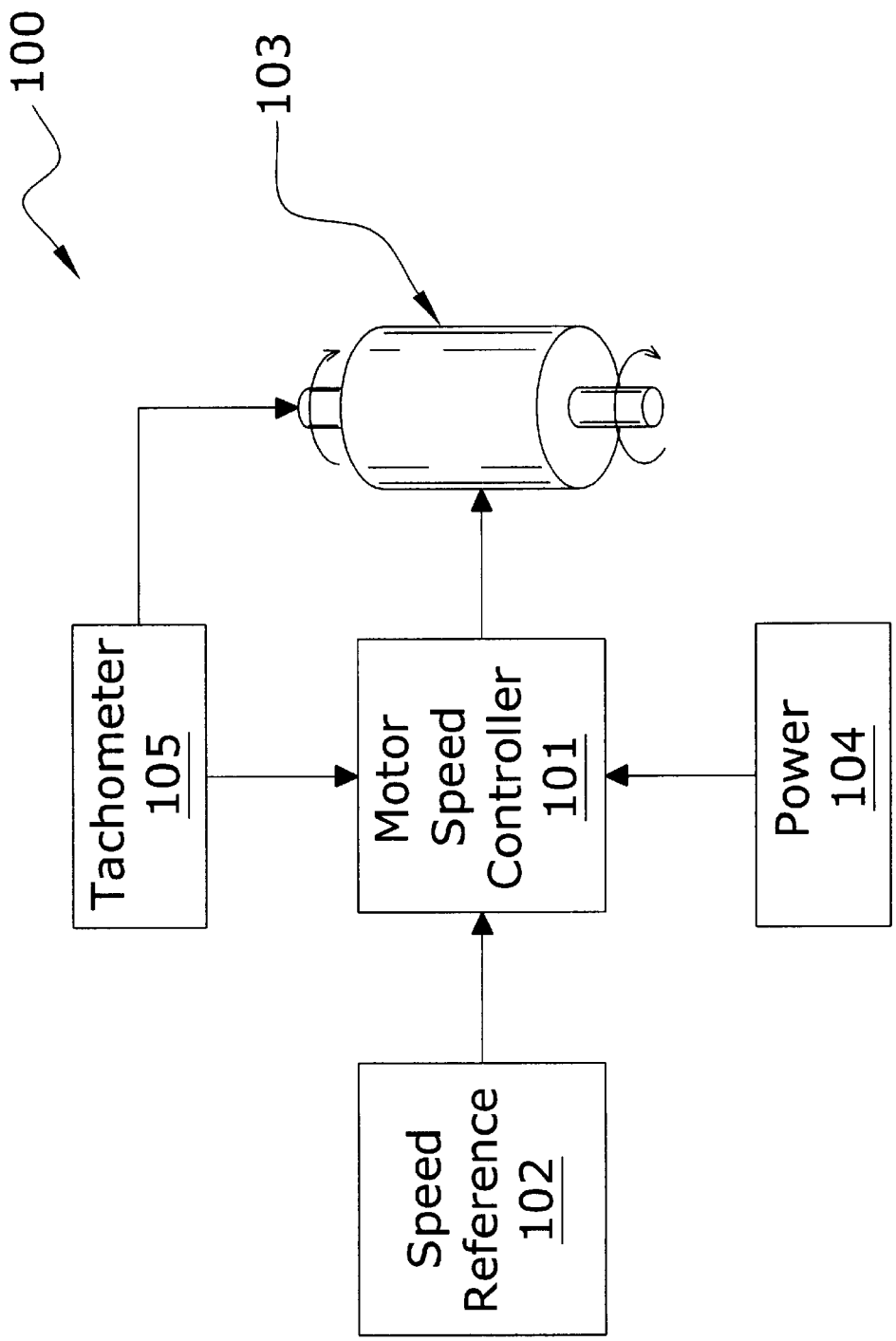
FIG. 1 is a simple block diagram of prior art motor control.
Figure 2:
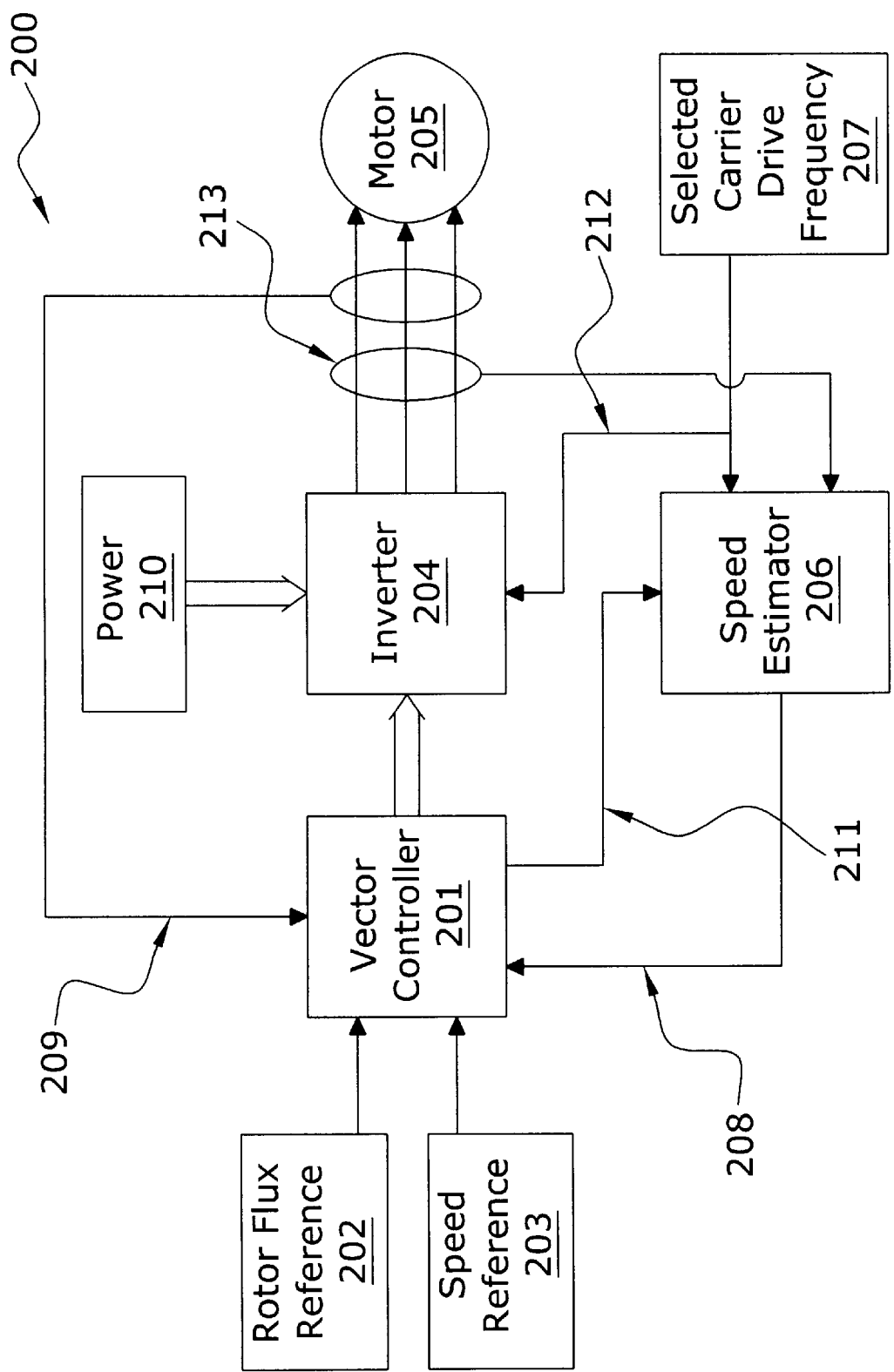
FIG. 2 is a block diagram of the preferred embodiment of the motor control system.

FIG. 2 is a block diagram of the preferred embodiment of the motor control system 200 and is based on the current vector controller technology 201 to drive an AC induction motor 205. For a synchronous motor, a similar motor speed controller may be used. The vector controller is functionally dependent on a rotor flux reference 202 and the speed reference 203 with feedback information 208 from the inventive solution, the Speed Estimator (SE) 206 to provide accurate control information to the inverter 204. The SE computes the motor speed estimate based on current waveform samples sensed at the motor drive connection 213 and the (fundamental) carrier drive frequencies (CDF) 211 derived from the vector controller or from the alternative selected carrier drive frequency (SCDF) 207. The carrier frequencies are provided to shorten the computational time of the Speed Estimator. The SCDF is selected instead of the carrier drive frequency to provide stable slow speed operation. A voltage feedback loop is shown 209, but is optional to optimize motor performance. The architecture of the vector controller is well known in the art, where a description of this type of control method can be found in P. Vas, "Vector Control of AC Machines", Oxford Science Publications, 1990. The inverter is basically an array of field effect transistors that couple power from the power bus 210 to the motor 205 as modulated by the control information from the vector controller. As with the vector controller, SE is compatible with any standard inverter control. Whatever method of inverter control is selected, it can be modified to allow the input of a fixed carrier frequency 207 as shown connected 212 in FIG. 2.

Standard Application of the Fast Orthogonal Search Algorithm

The speed estimator of the inventive solution is based on the Fast Orthogonal Search (FOS) method. FOS is the most basic algorithm to perform an orthogonal search. FOS can take a set of non-orthogonal functions (a portion of a sine and cosine wave) and fit them to the sampled signal. FOS can search for frequencies with periods longer than the sampling window as well as those with a fractional number of periods in the sampling window. FOS can also be used to search for orthogonal signals. Non-orthogonal signals can be parts of sine or cosine waveforms. The mathematical model of the Fast Orthogonal Search (FOS) is as follows:

$$y(n) = \sum_{m=0}^{M} a_m p_m(n) + \zeta(n) \tag{2}$$

where any sampled signal y(n) of length N can be considered as a weighted combination of M candidate functions $p_m(n)$ and an error $\zeta(n)$.

A set of candidate functions is chosen to represent sine and cosine function pairs having particular frequencies of interest. These are the functions that FOS ultimately searches for in the original sampled signal. Each candidate function is given a length of N to match that of y(n). Candidate pairs are given by the following relationships:

$$p_{2m}(n) = \sin\left(\frac{2\pi f_m n}{F_s}\right) \quad (3)$$

$$p_{2m+1}(n) = \cos\left(\frac{2\pi f_m n}{F_s}\right) \quad (4)$$

where $F_s$ is the signal sampling rate.

There are M candidate pairs in total. This represents the total number of searched frequencies. The set of candidate frequencies $f_m$ can represent any desired frequencies, where $0 < f_m < F_s/2$ ($F_s/2$=Nyquist rate for digital sampling). The set of frequencies does not need to be contiguous. The resolution of possible $f_m$'s has a limit and will be discussed later.

The same sampled signal y(n) can also be expressed as a combination of M orthogonal functions $\omega_m(n)$ and some error $\epsilon(n)$.

$$y(n) = \sum_{m=0}^{M} g_m w_m(n) + \varepsilon(n) \quad (5)$$

The FOS algorithm first finds the weights $g_m$ relating the orthogonal functions to y(n). The original weights relating the non-orthogonal candidate functions to y(n) can then be found. The set of orthogonal functions is derived from the chosen candidate functions using the Gram-Schmidt orthogonalization algorithm.

In the Gram-Schmidt algorithm, an orthogonal function can be calculated as the corresponding candidate minus the weighted sum of previous orthogonal functions, as given by:

$$w_m(n) = p_m(n) - \sum_{r=0}^{m-1} \alpha_{mr} w_r(n) \quad (6)$$

The matrix $\alpha$ is of size m×m, and contains for each orthogonal function, the weights of all the previous functions that it is composed of. Note that only half the matrix is used. A triangular shaped matrix rather than rectangular would save 50% of the otherwise required memory space.

To start building the orthogonal set, the first orthogonal function is set equal to the first candidate.

$$w_0(n) = p_0(n) \quad (7)$$

The time correlation function is defined as follows:

$$D(m,r) = \overline{p_m(n)w_r(n)} \quad (8)$$

and it can be shown that:

$$D(m,m) = \overline{w_m^2(n)} \quad (9)$$

The weight $\alpha_{mr}$, relating $w_m$ to $w_r$ can be computed by:

$$\alpha_{mr} = \frac{\overline{p_m(n)w_r(n)}}{\overline{w_r^2(n)}} = \frac{D(m,r)}{D(r,r)} \quad (10)$$

For the FOS algorithm, computing the orthogonal functions $w_m(n)$ is not required, just the weights $g_m$ from equation (5). Thus D (m, r) can be computed by using the following iterative equation:

$$D(m,r) = \overline{p_m(n)p_r(n)} - \sum_{i=0}^{r-1} \alpha_{ri} D(m,i) \quad (11)$$

The weights $g_m$ of the orthogonal series expansion is:

$$g_m = \frac{C(m)}{D(m,m)} \quad (12)$$

where, $$C(m) = \overline{y(n)p_m(n)} - \sum_{r=0}^{m-1} \alpha_{mr} C(r) \quad (13)$$

It can be shown that the weights relating the candidate functions to the sampled signal are given by:

$$\alpha_m = \sum_{i=m}^{M} g_i v_i, \quad v_m = 1 \quad (14)$$

where, $$v_i = \sum_{r=m}^{i-1} \alpha_{ir} v_r, \quad i = m+1, m+2, \ldots, M \quad (15)$$

The spectral density at a given frequency $f$ is a combination of the magnitude of the corresponding two (sine and cosine at frequency $f$) candidate functions.

$$F(f) = \sqrt{\alpha_{2m}^2 - \alpha_{2m+1}^2} \quad (16)$$

The phase spectrum is given by:

$$\phi(f) = -\tan^{-1}\left(\frac{a_{2m+1}}{a_{2m}}\right) \quad (17)$$

In the FOS algorithm shown above, the candidate functions are fitted in the order presented (0, 1, m−1) in order to reduce the mean squared error (MSE). To further reduce the MSE, the fitting of candidates can be accomplished in a different order. A search/sort can be performed to fit the candidates in the order that reduces the MSE by the most. Running the FOS with only one order of candidates does not guarantee an optimal result.

In order to build the spectrum of the sampled signal, a search for candidates is performed. For the FOS, candidates are chosen to minimize the MSE of the signal expansion given in equation 5. The MSE can be shown to be given by the following:

$$\overline{\varepsilon^2(n)} = \overline{y^2(n)} - \sum_{m=0}^{M} g_m^2 \overline{w_m^2(n)} \quad (18)$$

It then follows that the MSE reduction given by the $m^{th}$ candidate function is given by the following:

$$Q_m = g_m^2 \overline{w_m^2(n)} = g_m^2 D(m,m) \quad (19)$$

For the spectral search, candidates are searched for in pairs. Each frequency component of the original signal will be made of its respective sine and cosine component. For each sine and cosine candidate of a particular frequency, the Q is calculated. The Q's are then combined to determine the overall MSE reduction for the candidate pair.

$$Q_{pair}=Q_m+Q_{m+1} \tag{20}$$

The $m^{th}$ term corresponds to the sine candidate while the $(m+1)^{th}$ term is the cosine.

The search of candidates can be stopped using several criteria including, but not limited to:

Fit a set number of candidate pairs.

Fit enough candidate pairs to reduce the overall MSE to a predetermined threshold.

Continue to fit candidate pairs until the MSE reduction of the last candidate pair added is less than a threshold.

However, the above FOS is very computationally expensive. A typical FOS execution requires an exhaustive search of the full spectrum of possible frequencies, for harmonics. This time consuming search requires billions of calculations that search for all frequency components whether they are of interest or not. Subsequent computations must sort through the large data results for the application. Current microcontrollers are not capable to process this form of FOS in a real-time environment.

Inventive Application of the Fast Orthogonal Search

The Real Time Fast Orthogonal Search (RTFOS) method of the inventive Speed Estimator adjusts the traditional FOS method to reduce the computational time and derive the motor speed estimate in real-time, four to eight times faster than previous methods. The speed estimator excludes calculations of harmonic amplitudes and phase shifts since such calculation are unnecessary for determining motor speed. This, in essence, removes the need to perform the equations 14 to 17, thus increases the efficiency and speed of the RTFOS enabling it to run in a real-time environment.

In the preferred embodiment of the present invention, the Speed Estimator uses a modified Fast Fourier Transform (FFT) to perform correlation calculations between the current samples and the candidate frequencies. The FFT is given by:

$$X(k) = \sum_{n=0}^{N-1} x(n) e^{-j\frac{2\pi k}{N}n} \tag{21}$$

where k is the frequency bin index, n in time index, and N in the number of samples in the time series. The complex exponential in equation (21) can be expressed as sinusoids and cosinusoids resulting in $$X(k) = \sum_{n=0}^{N-1} x(n)\cos\left(\frac{2\pi kn}{N}\right) + j\sum_{n=0}^{N-1} x(n)\sin\left(\frac{2\pi kn}{N}\right). \tag{22}$$

Thus the real part of the FFT corresponds to a correlation with a cosine candidate function with a digital frequency $$\frac{2\pi k}{N},$$

and the imaginary part of the FFT corresponds to the correlation with a sinusoid candidate function at the same frequency.

The FFT is zero-filled to N points to increase the number of frequency bins that the FFT calculates. Candidate frequencies fm of equations 3 and 4 should coincide with the FFT bin frequencies:

$$f_m = k\, F_s/N \tag{23}$$

where $0 \leq k < N/2$. This is derived from the FFT output resolution of equation (1). The samples are zero filled to increase N. The higher the N value, the better the candidate resolution, but the computation time for the FFT and the RTFOS will also increase.

A suitable type of FFT is the real valued FFT with Decimation in Frequency (DIF). The DIF-FFT processes the input in the order it is collected. Since the bottom half or three quarters of the input is zero, the multiplication and addition operations required by these zero elements need not be performed. This reduces the computations required by the RTFOS.

Figure 3A:
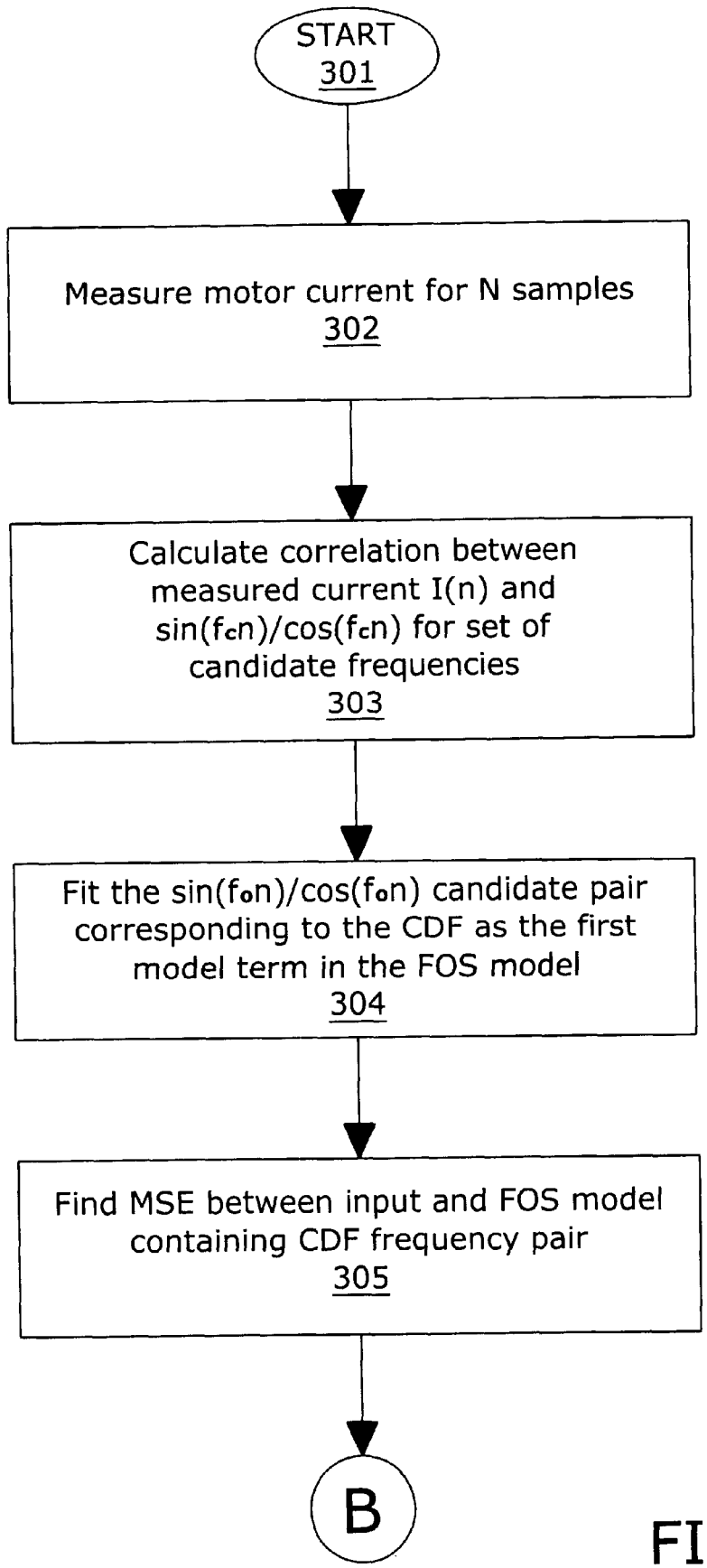
FIGS. 3A–3C is a flow chart of the steps to implement the preferred embodiment of the inventive solution.
Figure 3B:
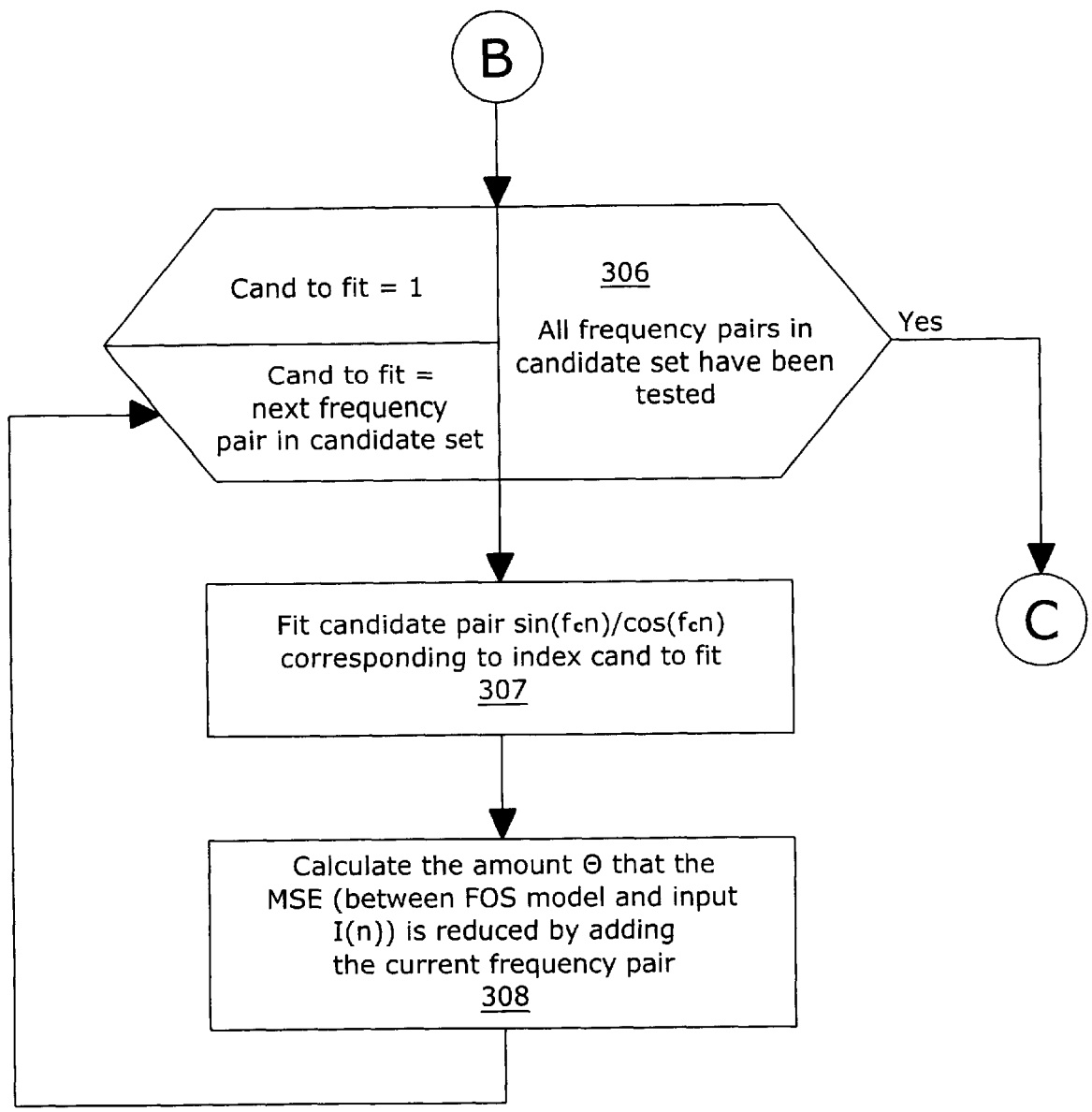
Figure 3C:
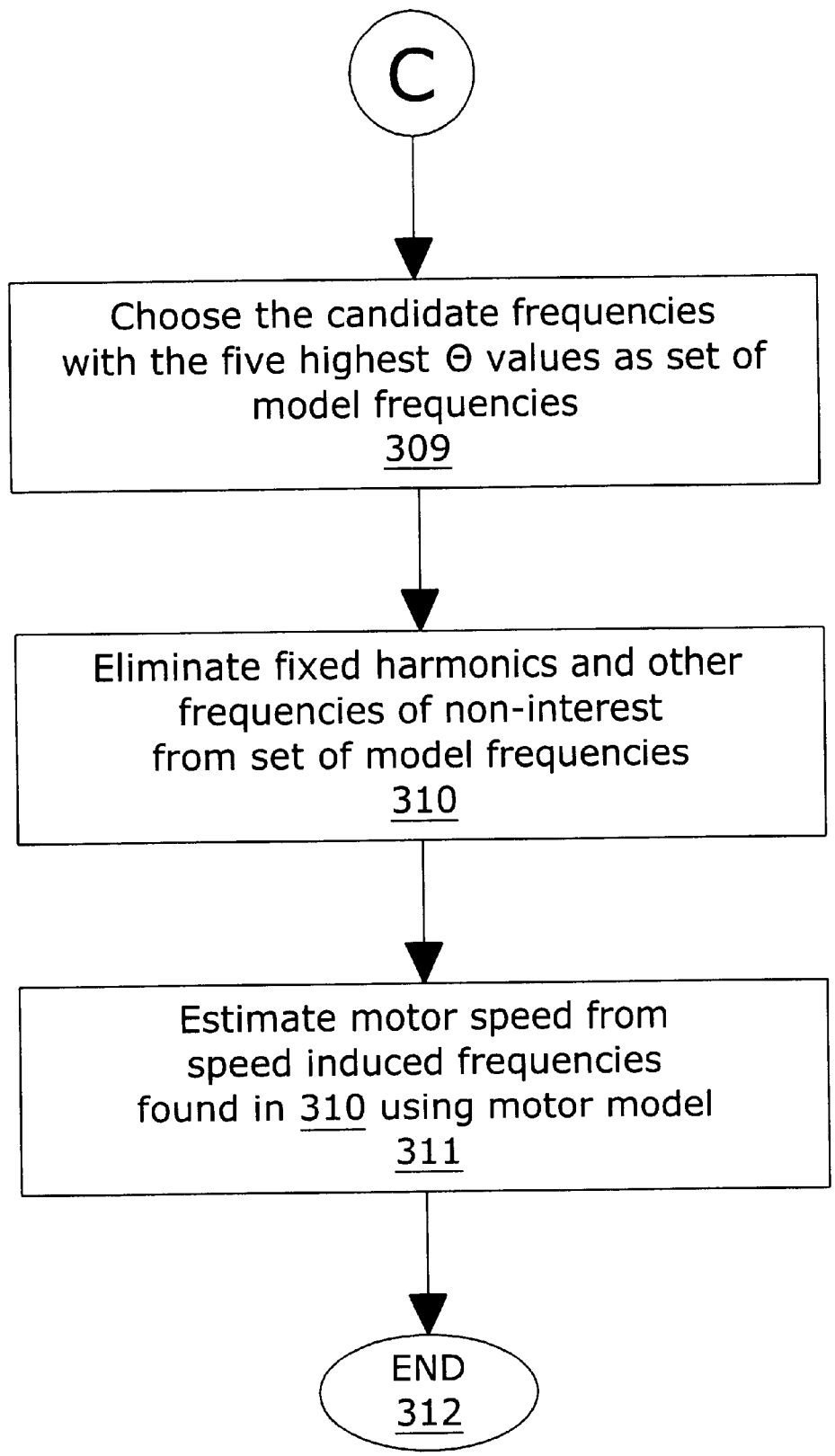

FIGS. 3A–3C illustrates the process to implement the inventive Speed Estimator based on a real-time fast orthogonal search algorithm 300. The speed estimation begins 301 recording N samples of the waveforms impressed by the (operating) motor on the motor power connection to the motor controller/inverter 302. The samples are collected during a fraction of a second, typically for about ⅛ of a second. The actual collection time depends on the necessary number of speed estimates per second as limited by the ability of the estimation algorithm and the applied microprocessor ability (speed of estimation and data storage). The more speed estimates available per second the better the control of the motor speed. Typically, 6 to 10 estimates per second are required for stable motor control below 2% base motor speed.

The waveform samples are interfaced from the current sensor to the estimator circuits via a high precision analog to digital (A/D) converter 213. The key information in the sampled data is about 1,000,000 times smaller (60 db) than the fundamental carrier drive frequency. An economical 14–16 bit A/D converter will provide at least a 84 dB dynamic range (i.e. similar to a communication receiver front end) which results in 4 to 6 least significant bits of digital information that can be distinguished from system noise. Sixteen and larger bit resolution A/D converters are available, but present higher cost considerations and potential noise suppression problems for the least significant bits (18–20 bits).

Subsequent to the A/D conversion, the frequencies for the sinusoidal functions can cover all possible frequencies or can be non-contiguous and cover many separate parts of the entire spectrum. The speed estimator calculates the correlation between the sampled signal and a set of candidate frequency pairs of interest 303. The set of candidates can cover all possible frequencies or can be non-contiguous and cover many separate parts of the spectrum.

Conventional methods may be used for correlation calculations; however, to save computation time, the calculations are performed using zero-filled, adjusted FFT. This is achieved by choosing the candidate frequencies to correspond to the frequency bins of the zero-filled FFT. Zeros are added to the sampled signal to increase the length of the data record, such as adding 1024 zeros to the end of 1024 sample values to increase the record length to 2048 points. Zero-filling increases the number of frequencies calculated for correlation. Knowing the FFT is zero filled, it is possible to remove some multiplication and addition operators in the FFT algorithm. This further minimizes calculation time of the correlation of the input and the candidate functions.

In the inventive solution, the motor controller is modified such that during the sampling of the motor current waveforms, the carrier drive frequency (CDF) (adjusted by the motor controller for speed control) is held constant at a frequency corresponding to a zero-filled FFT bin. This is done to eliminate unwanted spectral leakage derived from the CDF, causing additional detection work by the speed estimator. Once a sufficient number of samples are collected, the CDF used during that period is recorded by the motor controller and supplied to the Search Estimator. This connection 211 is shown in FIG. 2 between the vector controller 201 and the SE 206. While running at the held synchronous frequency, the motor speed is being regulated by known voltage feedback methods alone.

Next, the Speed Estimator chooses the carrier drive frequency as the first candidate frequency pair in the orthogonal model 304 as it has the most energy (the largest amplitude) in the sampled frequency spectrum. By force-fitting the CDF, the need for the estimator to search for the CDF is eliminated along with its associated computational effort and time. If the CDF is not limited to coincide with a FFT bin, some of the energy from the CDF will be distributed to all the other FFT bins in a phenomenon known as spectral leakage. Since the CDF is 100 to 1000 times the amplitude of the speed-induced harmonics; the amplitude of the spectral leakage may be larger than the speed induced harmonic amplitude, in effect masking the speed-induced harmonic. Also, if the CDF is not limited to coincide with a FFT bin the correlation between the CDF and all other candidate frequency pairs has to be calculated point by point. Consequently, restricting the CDF to a FFT bin frequency prevents spectral leakage and reduces the computation time of the SE.

For near zero speed operation, when the CDF is reduced to or below 1 Hz and the motor is running less than or equal to 2% rated base speed, the speed estimator selects a selected carrier drive frequency (SCDF) higher than the CDF to be used by the estimator and to be added at the inverter controller. At low speeds, the motor speed information (harmonics) would otherwise be spaced very close together making it difficult to accurately detect their frequencies and determine the motor speed estimate.

The process of fitting the candidate frequency pairs involves deriving a function orthogonal to all the previously fitted functions, from the candidate function. The Gram-Schmidt (GS) or modified Gram-Schmidt (mGS) algorithm is used for the orthogonalization. Once the orthogonal functions are derived, the weights of these orthogonal functions in model of the input are calculated as part of the fitting process. These algorithms are described in K. Adeney and M. Korenberg, "Fast Orthogonal Search for Array Processing and Spectrum Estimation", IEE. Proc. Visual Image Signal Processing, Vol. 141, No. 1, February 1994 and herein is included by reference.

In step 305, the mean-squared error (MSE) between the model of orthogonal functions created in 304 and the input I(n) is calculated. RTFOS minimizes the MSE between the model of orthogonal functions fitted and the input I(n).

In step 306, a loop is initialized to test each of the candidate frequency pairs as the second frequency pair in the orthogonal model. The variable "cand__to__fit" is used as an index to step through the remaining candidate frequencies in the set of candidate frequencies. Note, since the frequency corresponding to the frequency of the CDF has already been fitted in 304 it will not be a part of the remaining candidate set.

In step 307, each candidate pair is fitted as the second frequency pair in the orthogonal model. The orthogonalization algorithm is used to calculate a pair of orthogonal functions for the current candidate pair indexed by cand__to__fit. The reduction in mean square error between model (previously fitted signals plus the current signal) and the original sampled signal is calculated in 308. Step 308 is the end of the for loop so the process returns to step 306 to continue the for loop or exit the loop if all the candidate frequencies pairs have been tested.

If there are no more candidate signal pairs to be fitted, the five candidate frequencies with the highest MSE reduction (Q) are selected for the model terms 309. Selecting more than one candidate pair at any one time greatly reduces the number computations required by FOS. However, it can potentially provide less than optimal results when the frequencies in the FOS model are close in frequency. However this risk diminishes as the frequencies are further apart. This problem did not seem to appear in the embodiment of our SE.

Next, the frequencies known to be motor controller (CDF) harmonics are removed 310 from the list of frequencies found by the Speed Estimator. The remaining frequencies are assumed to be motor speed harmonics. The mathematical speed harmonic model previously discussed gives an indication of where the harmonics should be at any given motor speed; therefore, the speed of the motor 311 is estimated by comparing the motor speed harmonics estimated by the RTFOS based Speed Estimator and the Speed Harmonic Model for a match. Each result can be averaged or otherwise discarded to determine the final estimation 312.

The inventive solution in FIGS. 3A–3C includes many modification to the prior art FOS algorithm. Force fitting the known CDF 304 is novel. The prior art FOS algorithm chooses only one candidate frequency in step 309, then it fits the selected frequency pair in the orthogonal model and repeats the loop 306–308 to fit the next (third) model term. In RTFOS, the model terms 309 are not fitted into the orthogonal model as only their frequencies are of interest and the computations required to fit the model are not required. Steps 310–311 are not part of RTFOS but represent the speed estimation using the frequencies detected by RTFOS.

Figure 4:
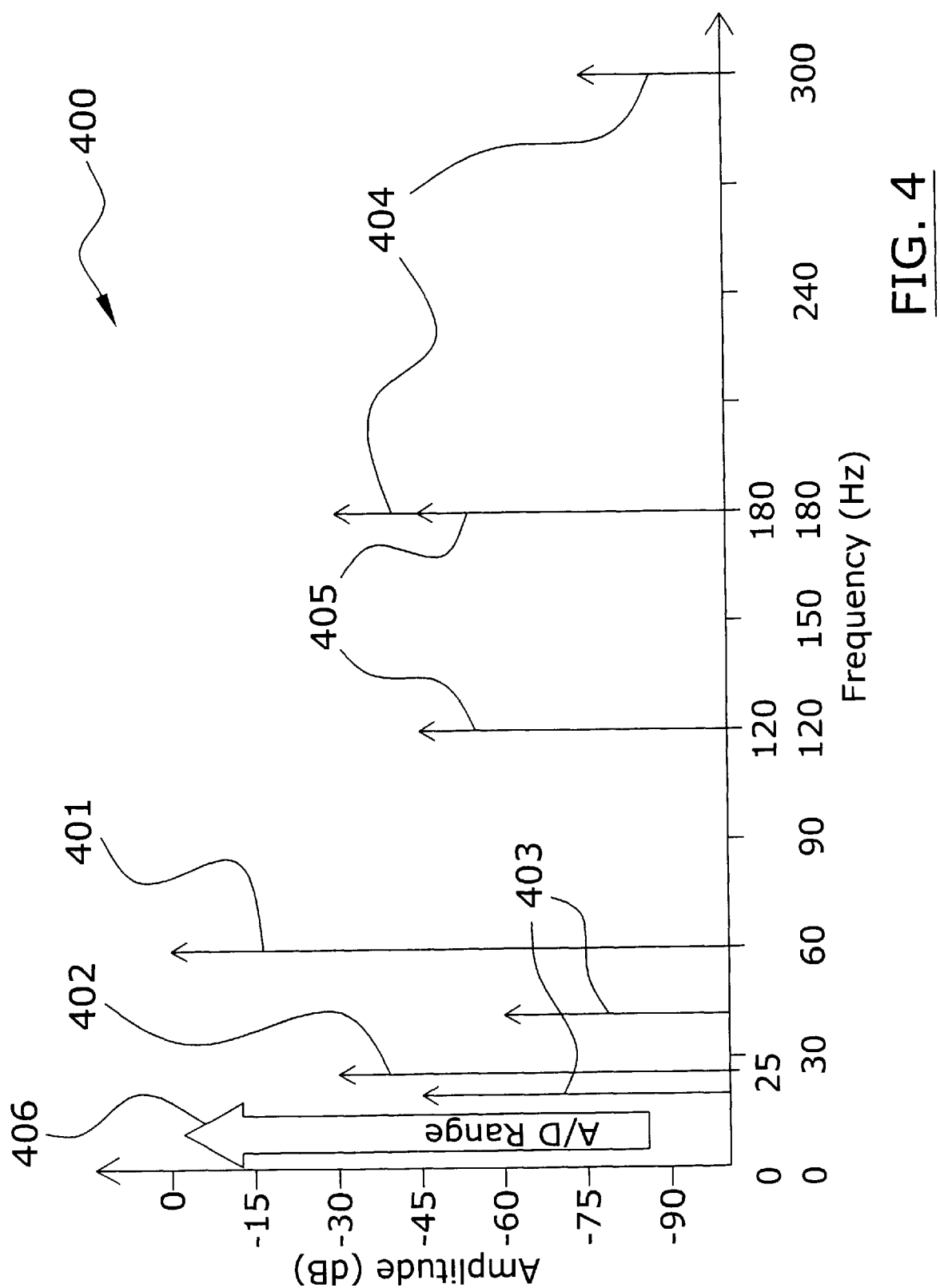
FIG. 4 is a diagram of the frequency spectrum in which the inventive speed estimator detects speed related information.

FIG. 4 depicts a frequency spectrum graph of the key signals to be sensed, filtered and matched for a speed estimate by the Speed Estimator 400 to illustrate the preferred and second embodiment of the invention. The sampling sensitivity of the estimator sampling A/D is shown 406 with reference to the vertical (amplitude) axis. In this example, the carrier drive frequency (CDF) is 60 Hz, driving the typical induction motor at the rated base speed 401 with resulting unwanted odd harmonics 404 (even and other harmonics of similar amplitude are not shown for clarity). A sub-harmonic frequency 402, used in the second embodiment, is shown at 25 Hz that indicates a rough estimate of motor speed as:

$$25 \text{ Hz/ rated base speed frequency (60 Hz)} \times \text{rated base speed} = 750 \text{ RPM}$$

where the example rated base speed is 1800 RPM. Other unrelated noise frequencies are shown to either side 403 of the sub-harmonic. Examples of two speed-induced harmonics are shown at 120 Hz and 180 Hz 405 separated by 2 times the CDF. Note that the second frequency, 180 Hz coincides with a harmonic of the CDF; consequently, the frequency may not be used in the final speed estimate computation.

Figure 3D:
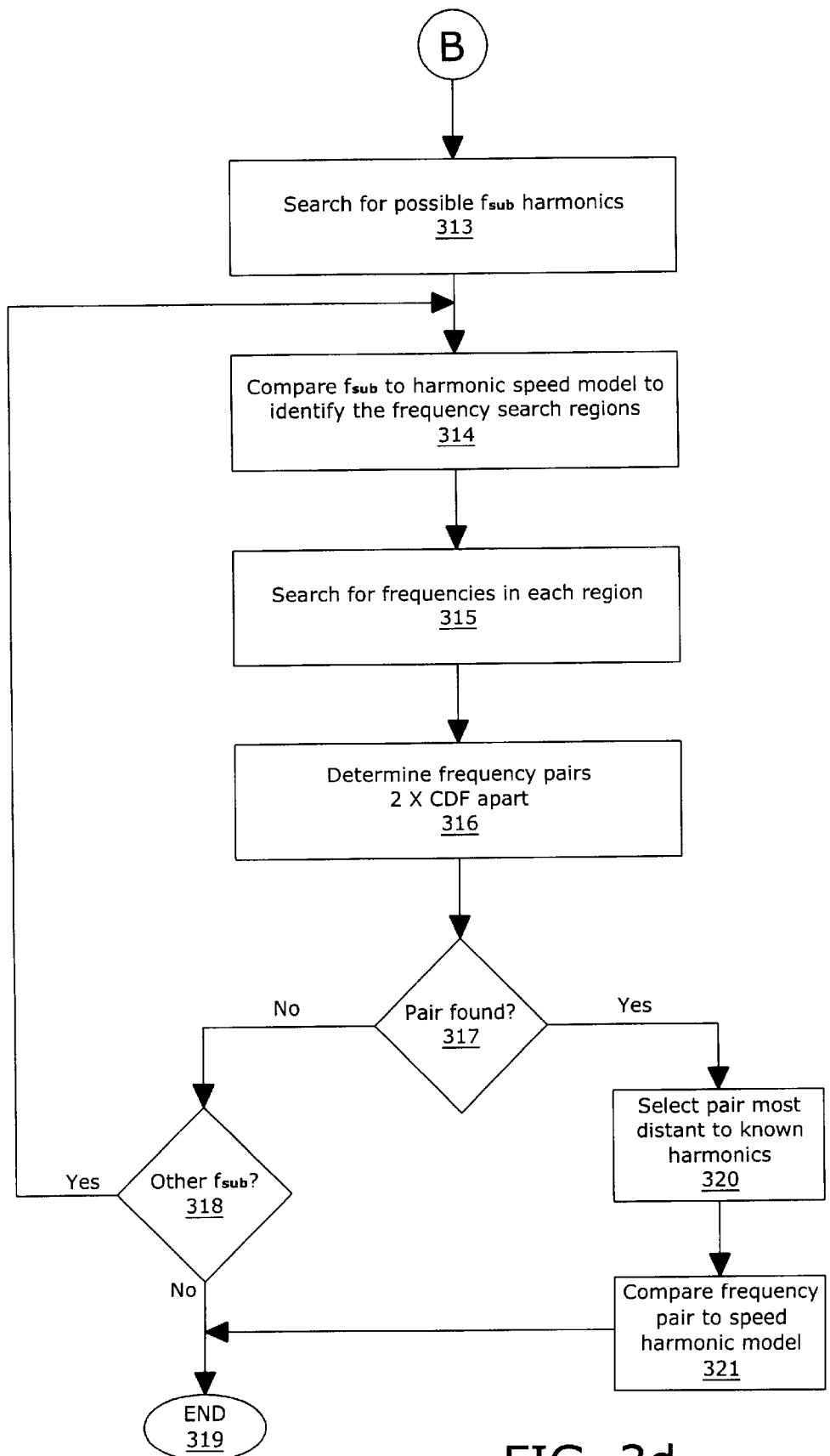
FIG. 3D is a flow chart that depends from FIGS. 3A–3C that shows a second embodiment of the present invention.

FIG. 3D, with reference to FIG. 3A, shows the steps to implement the second embodiment of the invention to further reduce the computation speed of the Speed Estimator by making the candidate search space as small as possible. In the first step 313, the RTFOS searches for possible sub-harmonic frequencies between the carrier drive frequency (or the SCDF) used during sampling and 0 Hz. Reference the discussion for FIG. 4. Next, one of the sub-harmonic frequencies is compared to the Harmonic Speed Model to locate two separate frequency regions where corresponding harmonics $f_1$ and $f_2$ would have to be in order to make a pattern match with the Harmonic Speed Model 314. The sub-harmonic frequency used may be the first one found, or it may be the sub-harmonic with the highest amplitude, or it may be the sub-harmonic closest to the sub-harmonic found in the previous estimate of the SE. The speed estimator then searches 315 for any harmonics in each region. It should be noted that, during a search of these regions, the SE may employ varies technique to filter and/or discriminate against other noise carriers using learned methods to avoid the time wasted detecting and processing erroneous signals. Next, the Speed Estimator (SE) determines which frequencies found in the first region correspond to a second frequency that is two times the CDF away in the second region 316. The Speed Estimator then determines whether several frequency pairs, if any, were found 317. If no frequency pairs were found, the estimator determines if any other sub-harmonic frequencies (the correct signal) where found 318. If not, the process ends 319 using the last motor speed estimate to signal the motor controller. If there are more $f_{sub}$, the process branches to repeat the steps to identify frequency pairs. If several expected frequency pairs were found, the process then selects the frequency pair most separated from the location of known harmonics 320, such as harmonics generated by the carrier drive frequency, to avoid an unwanted motor rather than speed related pair. Finally, each frequency of the pair is compared 321 to the speed harmonic model to estimate the motor speed. If there is more than one valid speed estimate, the estimates are averaged to result in a final value to drive the motor speed error correction circuits in the motor controller. The Speed Estimator process concludes 321.

Note the matching of two frequencies pairs 316 is by no means the only method of separating speed-induced harmonics from unwanted harmonics. Also discarding frequency pairs that coincide with known harmonics 320 may discard the speed-induced harmonics. These steps may be replaced with more sophisticated pattern match algorithms and a speed tracking routine respectively and in manner represents the only technique for estimating the motor speed from the RTFOS model frequencies.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method to estimate the speed of a motor comprising:
   (a) selecting to accept the carrier drive frequency or adding the selected carrier drive frequency;
   (b) sampling the current waveform at the motor;
   (c) selecting candidate frequencies for a sinusoidal candidate signal pair;
   (d) correlating the sampled waveform and candidate functions for all candidate frequencies of interest;
   (e) fitting the candidate signal pair that corresponds to the carrier drive frequency;
   (f) determining the reduction in the mean square error between previously fitted candidate signal pairs plus current test fit candidate signal pair and the original sample signal;
   (g) selecting top candidate signal pairs to fit spectrum model term;
   (h) removing unwanted frequencies from frequencies found; and
   (i) comparing spectrum model to motor speed harmonic model for match to establish motor speed estimate.

2. A method as claimed in claim 1, where said selecting to accept the carrier drive frequency or adding the selected carrier drive frequency comprises adding the selected carrier drive frequency when the motor speed is equal to or less than 2% rated motor base speed and selecting to accept the carrier drive frequency when the motor speed is above 2% rated motor base speed.

3. A method as claimed in claim 1, where said sampling comprises an analog to digital converter to sample the current waveform at the motor electrical power connection and convert the information to digital data for subsequent processing.

4. A method as claimed in claim 3, where said analog to digital converter comprises a minimum of 14-bit resolution.

5. A method as claimed in claim 1, where said sampling comprises holding the carrier drive frequency constant during the sampling.

6. A method as claimed in claim 1, where said sampling are a number of samples collected for a fraction of a second.

7. A method as claimed in claim 1, where said selecting candidate frequencies comprises the fundamental carrier drive frequency or selected carrier drive frequency is selected as the candidate frequency for a candidate frequency pair.

8. A method as claimed in claim 1, where said correlating is calculated using zero-filled Fast Fourier Transform.

9. A method as claimed in claim 1, where said fitting the candidate frequency pair comprises an orthogonalization algorithm to calculate a pair of orthogonal functions from the particular candidate signal pair.

10. A method as claimed in claim 1 or 9, where said fitting also includes calculating amplitude weights for the orthogonal functions to minimize the mean square error between the current samples and a model comprised of the orthogonal functions.

11. A method as claimed in claim 9, where said orthogonalization algorithm comprises the Gram-Schmidt algorithm or modified Gram-Schmidt algorithm.

12. A method to estimate the speed of a motor comprising:
   (a) selecting to accept the carrier drive frequency or adding the selected carrier drive frequency;
   (b) sampling the current waveform at the motor;
   (c) selecting candidate frequencies for a sinusoidal candidate signal pair;
   (d) correlating the sampled waveform and candidate functions for all candidate frequencies of interest;
   (e) fitting the candidate signal pair that corresponds to the carrier drive frequency;

(f) searching for possible sub-harmonic frequencies using RTFOS;

(g) comparing sub-harmonic frequency to a harmonic speed model to identify the frequency search regions;

(h) searching for frequencies in each region using RTFOS;

(i) determining frequency pairs;

(j) selecting frequency pairs most distant to known motor controller harmonics; and (k) comparing frequency pair to motor speed harmonic model for match to establish motor speed estimate.

13. A method as claimed in claim 12, where said selecting to accept the carrier drive frequency or adding the selected carrier drive frequency comprises adding the selected carrier drive frequency when the motor speed is equal to or less than 2% rated motor base speed and selecting to accept the carrier drive frequency when the motor speed is above 2% rated motor base speed.

14. A method as claimed in claim 12, where said sampling comprises an analog to digital converter to sample the current waveform and convert the information to digital data for subsequent processing.

15. A method as claimed in claim 12, where said sampling comprises holding the carrier drive frequency constant during the sampling.

16. A method as claimed in claim 12, where said sampling are a number of samples collected for a fraction of a second.

17. A method as claimed in claim 12, where said selecting candidate frequencies comprises the carrier drive frequency or selected carrier drive frequency is selected as the candidate frequency for a candidate frequency pair.

18. A method as claimed in claim 12, where said fitting the candidate frequency pair comprises an orthogonalization algorithm to calculate a pair of orthogonal functions from the particular candidate signal pair.

19. A method as claimed in claim 12 or 18, where said fitting also includes calculating amplitude weights for the orthogonal functions to minimize the mean square error between the current samples and a model comprised of the orthogonal functions.

20. A method as claimed in claim 18, where said orthogonalization algorithm comprises the Gram-Schmidt algorithm or modified Gram-Schmidt algorithm.

* * * * *